(12) United States Patent
Komori

(10) Patent No.: US 8,379,118 B2
(45) Date of Patent: Feb. 19, 2013

(54) IMAGING APPARATUS AND IMAGING METHOD

(75) Inventor: Hideaki Komori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/237,253

(22) Filed: Sep. 20, 2011

(65) Prior Publication Data

US 2012/0092533 A1     Apr. 19, 2012

(30) Foreign Application Priority Data

Oct. 19, 2010   (JP) .................. P2010-234652

(51) Int. Cl.
  *H04N 5/217*     (2011.01)
  *H04N 9/64*      (2006.01)
  *H04N 5/228*     (2006.01)
(52) U.S. Cl. ............. 348/241; 348/243; 348/222.1
(58) Field of Classification Search ......... 348/251, 348/E05.024, 246, 247, 607, 908, 909, 241, 348/245, 243, 248, 222.1; 358/461, 521, 358/3.26, 463; 382/274, 275, 149; 250/559.41, 250/559.45, 559.46
  See application file for complete search history.

(56) References Cited

U.S. PATENT DOCUMENTS

| 7,623,162 B2 * | 11/2009 | Inaba ..................... 348/246 |
| 8,264,580 B2 * | 9/2012 | Mori et al. ............... 348/308 |
| 2008/0273101 A1 * | 11/2008 | Takenaka et al. ........ 348/243 |
| 2009/0142000 A1 * | 6/2009 | Sono ...................... 382/274 |

FOREIGN PATENT DOCUMENTS

JP           10-313428        11/1998

\* cited by examiner

*Primary Examiner* — Tuan Ho
*Assistant Examiner* — Chan Nguyen
(74) *Attorney, Agent, or Firm* — Frommer Lawrence & Haug LLP; William S. Frommer

(57) ABSTRACT

An imaging apparatus in which a matrix of pixels converts light into electric charge. The pixels are disposed in an optically black area that receives no light so as to output optically black signals and in an effective pixel area that receives incident light. An analog amplifier applies predetermined gain to the electric charge read from the pixels in the effective pixel area. A vertical line detector calculates a correction value to remove vertical line-shaped fixed pattern noise. A vertical line corrector adds each of the correction values to the corresponding effective pixel signal to remove the vertical line-shaped fixed pattern noise; and a multiplier multiplies the corrected pixel signals by the digital gain so that the output pixel signal contains no vertical line-shaped fixed pattern noise caused by the digital gain.

6 Claims, 13 Drawing Sheets

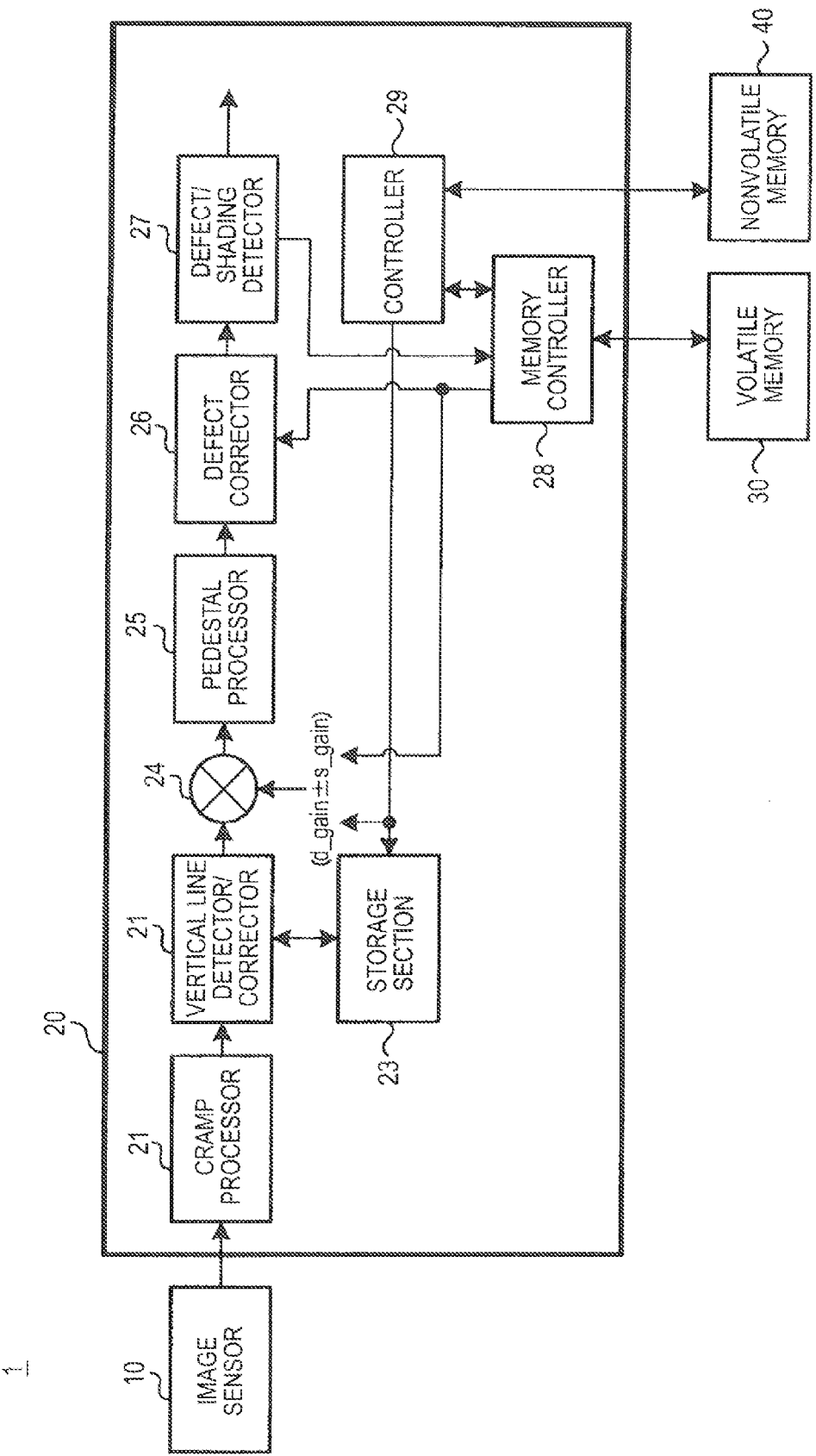

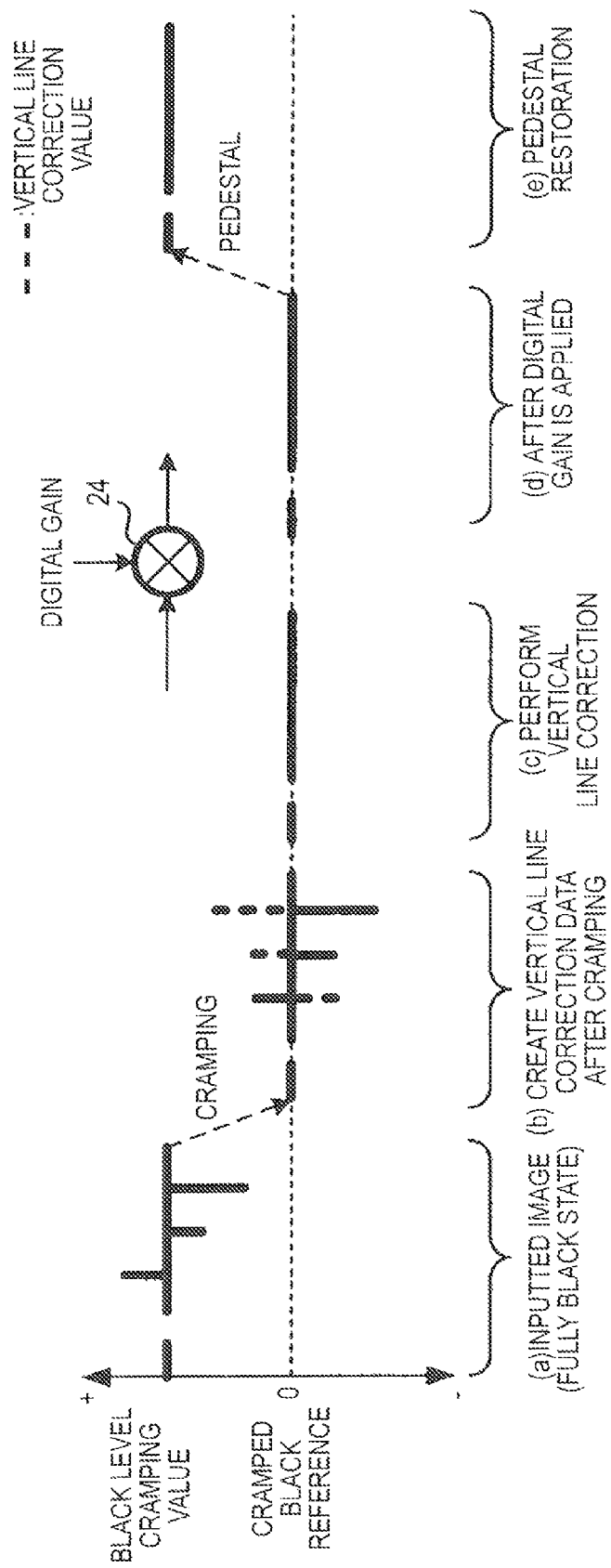

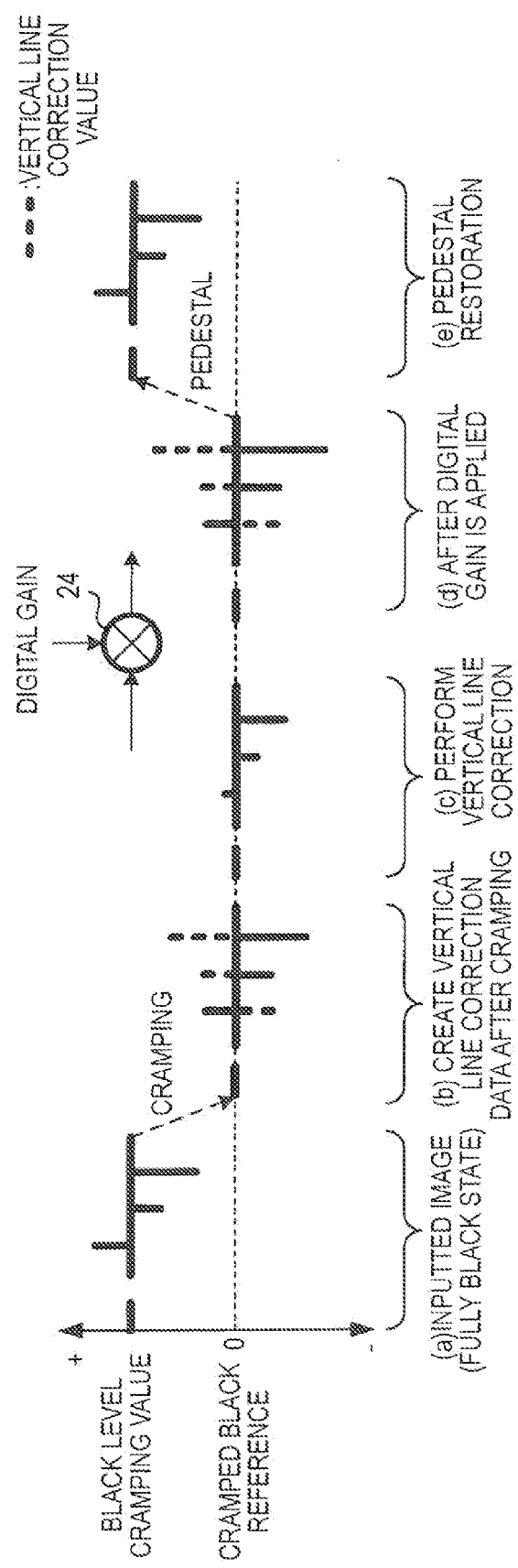

EXAMPLE OF VERTICAL LINE LEVEL DETECTION

EXAMPLE OF DEFECTIVE POINT DETECTION

------→ :NEGATIVE GAIN  ● :MAXIMUM OR AVERAGE

————→ :POSITIVE GAIN

EXAMPLE OF SHADING LEVEL DETECTION

FIG.13

| DEFECTIVE POINT | SHADING CORRECTION GAIN |
|---|---|
| 0 | +0.75 × |
| 1 | +0.00 × |
| ● ● ● | |
| 0 | +2.00 × |
| FIRST SET OF VERTICAL LINE CORRECTION VALUES (FOR 1 LINE) | |
| ● | |
| 25TH SET OF VERTICAL LINE CORRECTION VALUES (FOR 1 LINE) | |

SETS OF DATA CORRESPONDING TO NUMBER OF PIXELS IN 1 FRAME

25 SETS OF VERTICAL LINE CORRECTION VALUES

40

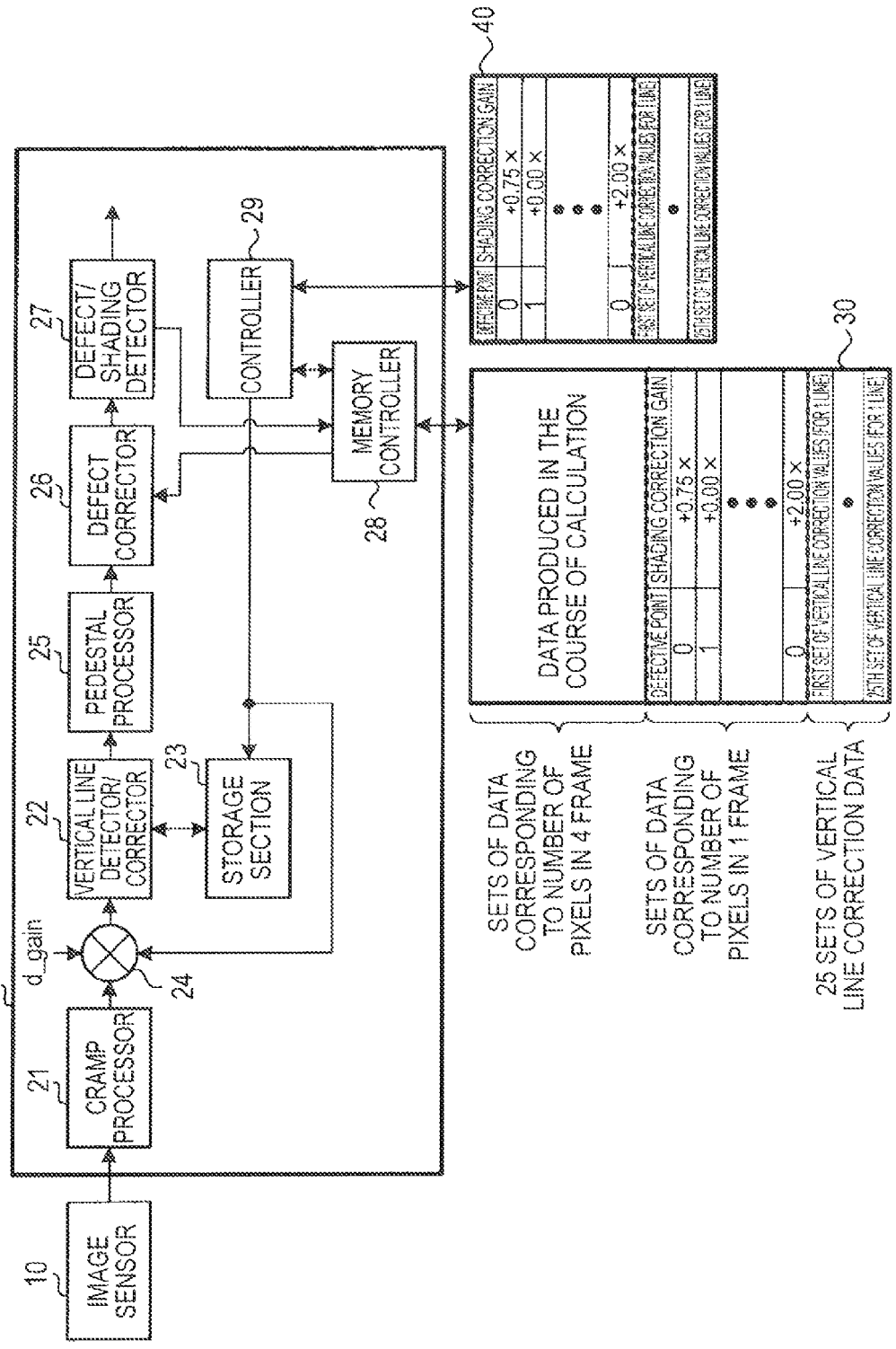

IMAGING APPARATUS AND IMAGING METHOD

FIELD

The present disclosure relates to an imaging apparatus, such as a video camcorder, and an imaging method used with the imaging apparatus, and particularly to a technology for removing vertical line-shaped fixed pattern noise.

BACKGROUND

In an imaging apparatus using an image sensor, vertical line-shaped fixed pattern noise appears in a specific portion of an image outputted from the imaging apparatus in some cases. For example, in an imaging apparatus using a CMOS image sensor, vertical line-shaped noise appears due, for example, to an offset error in an A/D converter that performs parallel processing on a column basis. In an imaging apparatus using a CCD image sensor, on the other hand, vertical line-shaped noise sometimes appears, for example, when high-frequency horizontal transfer pulses are used and the horizontal transfer pulses meet a specific phase condition.

The thus produced vertical line-shaped noise can be removed by detecting an offset component that is the source of the noise and subtracting the offset component from pixel signals. The offset component is present not only in outputs from pixels in an effective pixel area but also in outputs from pixels in an optically black area (hereinafter also referred to as OPB area). In view of the fact, optically black signals (hereinafter also referred to as OPB signals) outputted from pixels in the OPB area are used in related art to detect the amount of the offset component, that is, a vertical line level and produce a correction value used to remove the vertical line-shaped noise. The vertical line-shaped noise can be removed by multiplying effective pixel signals outputted from pixels in the effective pixel area by the thus produced correction value.

Part of the OPB area, which has a vertical shape and is so blocked that light is not incident thereon, is in many cases used as an area from which vertical line levels are detected, specifically, an area having a width corresponding to the number of lines in the effective pixel area. In the period during which the area is scanned, OPB signals read from the pixels in the area are used to detect a vertical line level and produce a correction value, which is used to process effective pixel signals from the lines in the effective pixel area. The vertical line-shaped noise can thus be removed in real time while images are captured at the same time. In the method described above, however, the absolute number of locations where a vertical line level is sampled is small, resulting in decrease in precision in detection of the vertical line level. That is, vertical line-shaped noise will not be corrected in a satisfactory manner.

As a method for improving the precision in detection of a vertical line level, for example, JP-A-10-313428 describes a method for selecting pixels corresponding to a plurality of horizontal lines in an image sensor, summing outputs from the pixels in the vertical direction, dividing the sums by the number of summed lines to produce averages, and producing correction data by using the averages.

SUMMARY

On the other hand, when an image sensor used in an imaging apparatus has a narrow variable analog gain range, digital gain is further applied in a later stage. For example, when the variable analog gain range of the image sensor ranges from 1× to 4×, applying digital gain ranging from 1× to 2× in a later stage provides an expanded variable camera gain ranging from 1× to 8×.

However, when a vertical line level is not detected precisely and hence vertical line-shaped noise is not removed sufficiently, applying digital gain disadvantageously enlarges the vertical line-shaped noise in the width direction.

Thus, it is desirable to improve an ability to correct vertical line-shaped noise without losing real time processing speed in an imaging apparatus in which analog gain and digital gain are both applied.

An embodiment of the present disclosure is directed to an imaging apparatus including pixels, an analog amplifier, a vertical line detector, a vertical line corrector, and a multiplier. Each of the components described above has the following configuration of function: The pixels, which convert subject light incident through a lens into electric charge and accumulate the electric charge, are disposed in an optically black area so blocked that no light is incident thereon and outputting optically black signals and in an effective pixel area unblocked so that light is incident thereon, the pixels disposed in the optically black area and the effective pixel area being arranged in a matrix in horizontal and vertical directions.

The analog amplifier applies predetermined gain to the electric charge read as an effective pixel signal from each of the pixels in the effective pixel area and outputs the resultant signal. The vertical line detector first changes again factor of the analog amplifier from a minimum to a maximum with the lens blocked and reads a pixel value of each pixel disposed in each vertical column arranged in an area formed of predetermined horizontal rows in the effective pixel area. The vertical line detector subsequently calculates an arithmetic average of the read pixel values in each of the vertical columns and subtracts each of the calculated arithmetic averages from a cramped black level (zero) so as to detect a vertical line level. The vertical line detector then calculates correction values used to remove vertical line-shaped fixed pattern noise based on the detected vertical line levels. The vertical line corrector adds each of the correction values calculated by the vertical line detector to the corresponding effective pixel signal. The multiplier multiplies each of the effective pixel signals by the digital gain or multiplies each of the pixel signals having undergone the vertical line correction in the vertical line corrector so that the pixel signal contains no vertical line-shaped fixed pattern noise by the digital gain.

The configuration and processing described above allows vertical line-shaped noise correction values in each horizontal position in the effective pixel area to be produced in accordance with every analog gain stage. The thus produced correction values are used to correct the vertical line-shaped noise.

According to the embodiments of the present disclosure, since a vertical line level of vertical line-shaped noise is produced based on an arithmetic average of the pixel values of pixels disposed in each vertical column arranged in an area formed of predetermined horizontal rows in the effective pixel area, the vertical line level is detected more precisely. That is, the vertical line-shaped noise is corrected in a more satisfactory manner. Further, the vertical line-shaped noise is corrected in real time based on correction values produced in advance for all analog gain stages. Moreover, since vertical line level detection is performed with high precision, vertical line-shaped noise can be corrected even in an imaging apparatus in which digital gain is applied in addition to analog gain.

BRIEF DESCRIPTION OF THE DRAWINGS

FIG. 1 is a block diagram showing an example of the configuration of an imaging apparatus according to a first embodiment of the present disclosure;

FIG. 3 shows an example of how pixel signals and correction values change before and after vertical line-shaped noise correction and digital gain application according to the first embodiment of the present disclosure, in which (a) shows an example of pixel values of an inputted image, (b) shows an example of cramped pixel values and vertical line correction values produced based on the cramped pixel values, (c) shows an example of pixel signals having undergone vertical line correction, (d) shows an example of pixel signals to which digital gain is applied, and (e) shows an example of pixel signals having undergone pedestal restoration;

FIG. 4 shows an example of how pixel signals and correction values change before and after vertical line-shaped noise correction and digital gain application with vertical line components left, in which (a) shows an example of pixel values of an inputted image, (b) shows an example of cramped pixel values and vertical line correction values produced based on the cramped pixel values, (c) shows an example of pixel signals having undergone vertical line correction, (d) shows an example of pixel signals and vertical line correction values to which digital gain is applied, and (e) shows an example of pixel signals having undergone pedestal restoration;

FIG. 13 is a descriptive diagram showing an example of the configuration of a nonvolatile memory according to the first embodiment of the present disclosure; and FIG. 14 is a block diagram showing an example of the configuration of an imaging apparatus according to a second embodiment of the present disclosure.

DETAILED DESCRIPTION

Figure 2A:
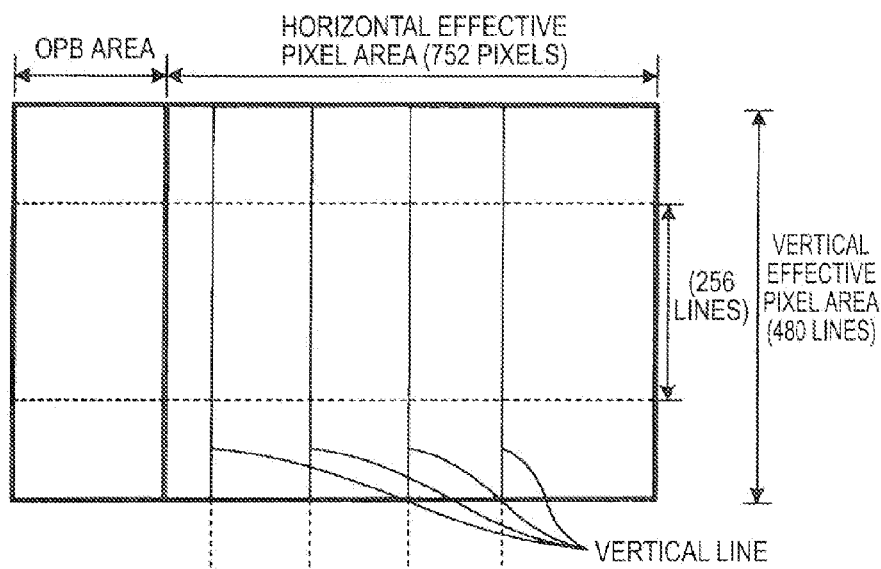
FIGS. 2A to 2C are descriptive diagrams showing an example of vertical line level detection according to the first embodiment of the present disclosure, FIG. 2A showing an example of an area where a vertical line level is detected, FIG. 2B showing an example of a vertical line level, and FIG. 2C showing an example of how a vertical line level is stored in a storage section.

Embodiments for carrying out the present disclosure will be described below. The description will be made in the following order.

1. First Embodiment (a case where a single multiplier is used to perform vertical line-shaped noise correction and black shading correction)

2. Second Embodiment (a case where vertical line-shaped noise correction is efficiently performed)

<1. First Embodiment>
[Example of Overall System Configuration]

FIG. 1 is a block diagram showing an example of an imaging apparatus according to a first embodiment of the present disclosure. An imaging apparatus 1 shown in FIG. 1 includes an image sensor 10, a signal processor 20, a volatile memory 30, and a nonvolatile memory 40.

The image sensor 10 is formed, for example, of a CMOS solid-state imaging device and converts subject light passing through a lens (not shown) and focused on an imaging surface of the image sensor into electric pixel signals. The image sensor 10, which is a CMOS solid-state imaging device in the present embodiment, may alternatively be any other solid-state imaging device, such as a CCD solid-state imaging device.

In the present embodiment, an effective pixel area has horizontally arranged 752 pixels multiplied by vertically arranged 480 lines, as shown in FIG. 2A. In addition to the effective pixel area, an OPB area so blocked that no light is incident thereon through the lens is provided.

The imaging apparatus 1 according to the present embodiment detects a vertical line level by using effective pixel signals outputted from pixels in the effective pixel area instead of signals outputted from pixels in the vertically extended OPB area. A vertical line level is therefore detected with the lens blocked, that is, in what is called a fully black state, for example, at the time of adjustment before shipping from a factory or at the time of calibration instructed by a user. In the present embodiment, a vertical line level is detected in an area formed of horizontally arranged 752 pixels multiplied by vertically arranged 256 lines in the effective pixel area. The number of vertically arranged lines used to sample a vertical line level is not limited to 256 but may be any value that is two raised to some power and believed to be sufficient for the sampling.

The electric charge read from each pixel disposed in the effective pixel area is outputted as an effective pixel signal. Although not shown, each of the vertically arranged lines in the effective pixel area is provided with an analog amplifier and an A/D converter. The analog amplifier amplifies the level of each effective pixel signal, and the A/D converter converts the analog effective pixel signal into a digital pixel signal. In the present embodiment, the analog amplifier has 25 stages by which a variable range from 1× to 4× is achieved. The position where vertical line-shaped noise is produced and the amount of noise (vertical line level) depend on the stage to which the analog amplifier is set. In other words, the position where vertical line-shaped noise is produced and the amount of noise can be determined by the stage to which the analog amplifier is set. In the image sensor 10 used in the present embodiment, the position where vertical line-shaped noise is produced and the amount of noise do not change with temperature.

Referring back to FIG. 1, the configuration of the imaging apparatus 1 will be described again. The signal processor 20 is formed, for example, of a DSP (digital signal processor) and includes a cramp processor 21, a vertical line detector/corrector 22, a storage section 23, a multiplier 24, a pedestal processor 25, a defect corrector 26, and a defect/shading detector 27. The signal processor 20 further includes a memory controller 28 and a controller 29. The imaging apparatus 1 further includes the volatile memory 30 and the nonvolatile memory 40.

The cramp processor 21 performs cramping that allows the downstream multiplier 24 to apply digital gain not to an entire pixel signal but only to the portion related to change in brightness. That is, a cramping value is subtracted from the pixel value of an inputted pixel signal so that the black level of the pixel signal outputted from the image sensor 10 becomes zero. The cramping value is determined based on the level of an OPB signal outputted from the OPB area of the image sensor 10. The cramp processor 21 outputs the pixel signal having undergone the cramping to the vertical line detector/corrector 22.

The vertical line detector/corrector 22 detects a vertical line level based on the pixel signal outputted from the cramp processor 21 to produce a correction value and corrects vertical line-shaped noise based on the produced correction value. The vertical line detection and correction functions can be independently enabled and disabled. At the time of vertical line level detection, such as before shipping from a factory, the vertical line detection function is enabled, whereas the vertical line correction function is disabled. Conversely, at the time of actual correction after image capturing starts, the vertical line correction function is enabled, whereas the vertical line detection function is disabled. The vertical line level detection will be described later in detail with reference to FIGS. 2A to 2C, 3A to 3E, 4A to 4E, 5, and 6.

The storage section 23 is formed, for example, of a RAM and stores the vertical line level detected by the vertical line detector/corrector 22. The storage section 23 further temporarily stores the correction value produced based on the vertical line level. The multiplier 24 multiplies the pixel signal having undergone the vertical line-shaped noise correction in the vertical line detector/corrector 22 by digital gain set by a user and shading correction gain produced by the downstream defect/shading detector 27. The digital gain can be changed from 1× to 4×, and the shading correction gain is 2× at the maximum. In FIG. 1, "d_gain" represents the digital gain, and "s_gain" represent the shading correction gain. The description "d_gain±s_gain" includes "±" because the shading correction gain, which will be described later, can be a negative value.

The pedestal processor 25 adds the cramping value to the inputted pixel signal in order to change the black level of the pixel signal to which the gain has been applied by the multiplier 24 back to the actual black level. The pixel signal whose black level has been restored by the pedestal restoration is outputted to the defect corrector 26. The defect corrector 26 allows a defective pixel detected by the downstream defect/shading detector 27 to undergo interpolation using correction pixels. The correction pixels are produced based on a plurality of pixels disposed around the defective pixel. The defect corrector 26 can also be enabled and disabled. When the defect corrector 26 is disabled, the inputted pixel signal is outputted as it is to the defect/shading detector 27.

The defect/shading detector 27 receives the pixel signal whose black level has been restored by the pedestal processor 25, detects whether or not the inputted pixel signal represents a defective point, and detects the shading level contained in the pixel signal. The defective point refers to a pixel having too high a signal level when compared with surrounding pixels. A defective point is detected by comparing the pixel value of an inputted pixel signal with the cramping value. When a defective pixel is detected, a defect flag representing that the pixel in question is a defective pixel is set ("1"), whereas when a normal pixel is detected, the defect flag is cleared ("0"). The status of the defect flag is written to the volatile memory 30 under the control of the memory controller 28. The operation of the defect/shading detector 27 will be described later in detail with reference to FIGS. 7 to 11.

The shading level is defined by calculating pixel values of all pixels that form a single frame of an image obtained, for example, by capturing a uniform gray subject under a uniform light source and specifically refers to the difference between the maximum or average of the calculated pixel values and the pixel value of each inputted pixel signal. The thus determined difference is used to calculate shading correction gain, and the calculated shading correction gain is written to a predetermined area in the volatile memory 30. The multiplier 24 multiplies the pixel signal by the shading correction gain, whereby white (modulation) shading resulting from the characteristics of the image sensor and brightness unevenness resulting from decrease in the amount of light passing through a lens peripheral portion can be corrected simultaneously. That is, an image with no brightness unevenness in an image screen can be produced by replacing the pixel values of all pixels that form a single frame with the calculated maximum or average. When there is no dust contamination or defective point, correction using the maximum is the most accurate correction. On the other hand, the correction using the average can remove defects resulting from dust contamination or a small number of defective points to some extent although the dynamic range becomes narrow because the correction using the average applies negative digital gain. The user can choose whether the maximum or the average is used to calculate a correction value.

The defect/shading detector 27 can also be enabled and disabled. At the time of detection of a defective point and the shading level, the defect/shading detector 27 is enabled, whereas the multiplier 24 and the defect corrector 26 are disabled. After a defective point and the shading level are detected and before actual correction is initiated, the defect/shading detector 27 is disabled, whereas the multiplier 24 and the defect corrector 26 are enabled.

The memory controller 28 controls writing and reading data to and from the volatile memory 30. For example, a correction value produced by the vertical line detector/corrector 22 and the defect flag status and shading correction gain produced by the defect/shading detector 27 are written to the volatile memory 30 under the control of the memory controller 28. The memory controller 28 further controls writing and reading numerical data produced in the course of the correction value calculation performed in the components described above to and from the volatile memory 30. Further, a correction value or any other value stored in the volatile memory 30 is read and supplied to a component where actual correction is made under the control of the memory controller 28.

The controller 29 is formed, for example, of an MPU (micro-processing unit) and controls the operation of each of the components that form the imaging apparatus 1. For example, the controller 29 instructs the memory controller 28 to read a correction value or any other value having been written to the volatile memory 30 and write the read value to the nonvolatile memory 40 or read a correction value or any other value having been written to the nonvolatile memory 40 when the imaging apparatus is powered on and load the read value into the volatile memory 30.

The volatile memory 30 is formed, for example, of a RAM and receives the following values as written data: numerical data produced in the course of the correction value calculation performed in relevant components, a correction value produced by the vertical line detector/corrector 22, and the defect flag status and shading correction gain produced by the defect/shading detector 27. The nonvolatile memory 40 is formed, for example, of a flash memory and receives the following values as written data: a correction value produced by the vertical line detector/corrector 22 and the defect flag status and shading correction gain produced by the defect/shading detector 27. Examples of how the data described above are stored in the volatile memory 30 and the nonvolatile memory 40 will be described later with reference to FIGS. 12 and 13.

[Example of Vertical Line Level Detection]

An example of the vertical line level detection performed by the vertical line detector/corrector 22 will next be described with reference to FIGS. 2A to 2C, 3A to 3E, 4A to 4E, 5, and 6. The vertical line level detection is performed by using the horizontally arranged 752 pixels multiplied by the vertically arranged 256 lines in the effective pixel area of the image sensor 10, as shown in FIG. 2A. First, at the 752 locations in the horizontal direction in the area described above, the pixel values of all 256 pixels are summed in the vertical direction and the average (arithmetic average) pixel value is calculated. To remove random noise components, the pixel values of the horizontally arranged 752 pixels multiplied by the vertically arranged 256 lines are sampled on a 4-frame basis. The number of frames used to sample a vertical line level may be any value but at least 4. It is, however, noted that increasing the number of frames for the sampling also increases the amount of data produced in the course of the correction value calculation, and the areas in the nonvolatile memory 40 that hold values produced in the course of the calculation need to be expanded accordingly.

Figure 2B:
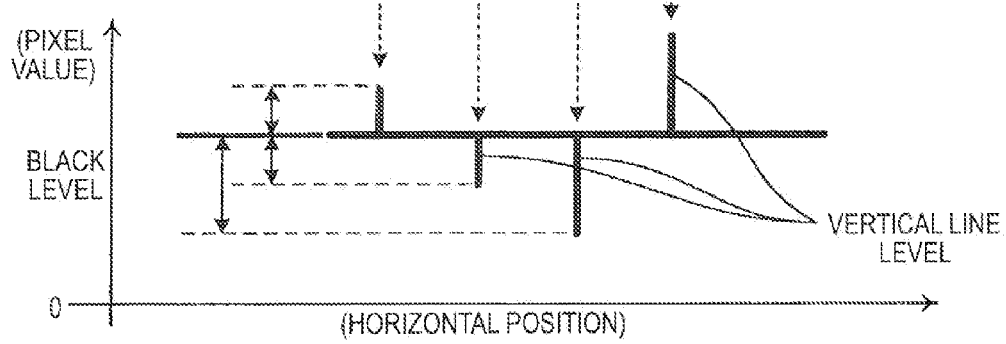

A vertical line level is expressed as the difference between the black level (=cramping value) and a pixel value, as shown in FIG. 2B. In FIG. 2B, the vertical axis represents the pixel value, and the horizontal axis represents the horizontal position. As indicated by the vertical solid lines in the effective pixel area in FIG. 2A, each location where vertical line-shaped noise is produced shows a large, positive or negative pixel value, as shown in FIG. 2B. A vertical line level can therefore be detected by subtracting the average of the pixels values of the 256 pixels in the vertical direction in each of the pixel positions in the horizontal effective pixel area from the cramped black reference (zero).

Figure 2C:
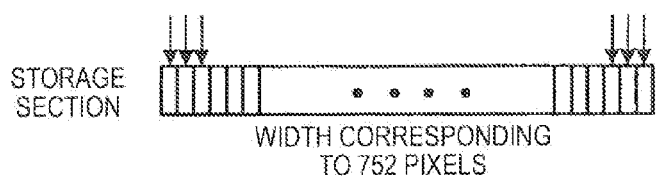

The average of the pixel values of the 256 pixels in the vertical direction in each of the pixel positions in the horizontal effective pixel area and a correction value produced based on the average are stored in the storage section 23 having a storage area corresponding to the number of horizontally arranged pixels (752) whenever the average and a correction value are produced, as shown in FIG. 2C.

In the present embodiment, since the pixel values of the horizontally arranged 752 pixels multiplied by the vertically arranged 256 lines are sampled on a 4-frame basis, a vertical line level is detected with high precision and the vertical line correction performed by the vertical line detector/corrector 22 is improved accordingly. As a result, the vertical line-shaped noise will not be exaggerated even when the downstream multiplier 24 applies digital gain to a pixel signal having undergone the vertical line correction. FIG. 3 shows how a pixel value (vertical line level) and, a correction value for correcting vertical line-shaped noise (hereinafter referred to as vertical line correction value) change. In FIG. 3, in which the vertical axis represents the pixel value level, each solid line represents a pixel value and each broken line represents a vertical line correction value. Pixel signals representing an inputted image obtained by capturing a fully black state shown in (a) in FIG. 3 are cramped, and vertical line correction values are produced based on the cramped pixel signals, as shown in (b) in FIG. 3. The vertical line correction values having the amounts corresponding to the vertical line levels and having directions opposite to the direction in which the vertical line-shaped noise is produced are added to the pixel values, whereby pixel signals containing no vertical line component are produced, as shown in (c) in FIG. 3. Digital gain is then applied to the pixel signals containing no vertical line component, and no vertical line is produced in the pixel signals to which the digital gain has been applied shown in (d) in FIG. 3 or the pixel signals having undergone pedestal restoration shown in (e) in FIG. 3.

FIG. 4 show how pixel signals change in a case where the number of sampling of a vertical line level is small and digital gain is applied with vertical line components left. In FIG. 4, in which the vertical axis represents the pixel value level, each solid line represents a pixel value and each broken line represents a vertical line correction value. Pixel signals representing an inputted image obtained by capturing a fully black state shown in (a) in FIG. 4 are cramped, and vertical line correction values are produced based on the cramped pixel signals, as shown in (b) in FIG. 4. The vertical line correction values, however, have not been produced based on sufficient sampling. As a result, performing the vertical line correction, in which vertical line correction values having directions opposite to the direction in which vertical line-shaped noise is produced are added to the pixel values, still leaves vertical line components that have not been removed, as shown in (c) in FIG. 4. When the multiplier 24 then applies digital gain to the pixel signals with the vertical line components left, the vertical lines are disadvantageously more exaggerated, as shown in (d) in FIG. 4 (in a second embodiment, the exaggerated vertical line components are used for correction).

Figure 5:
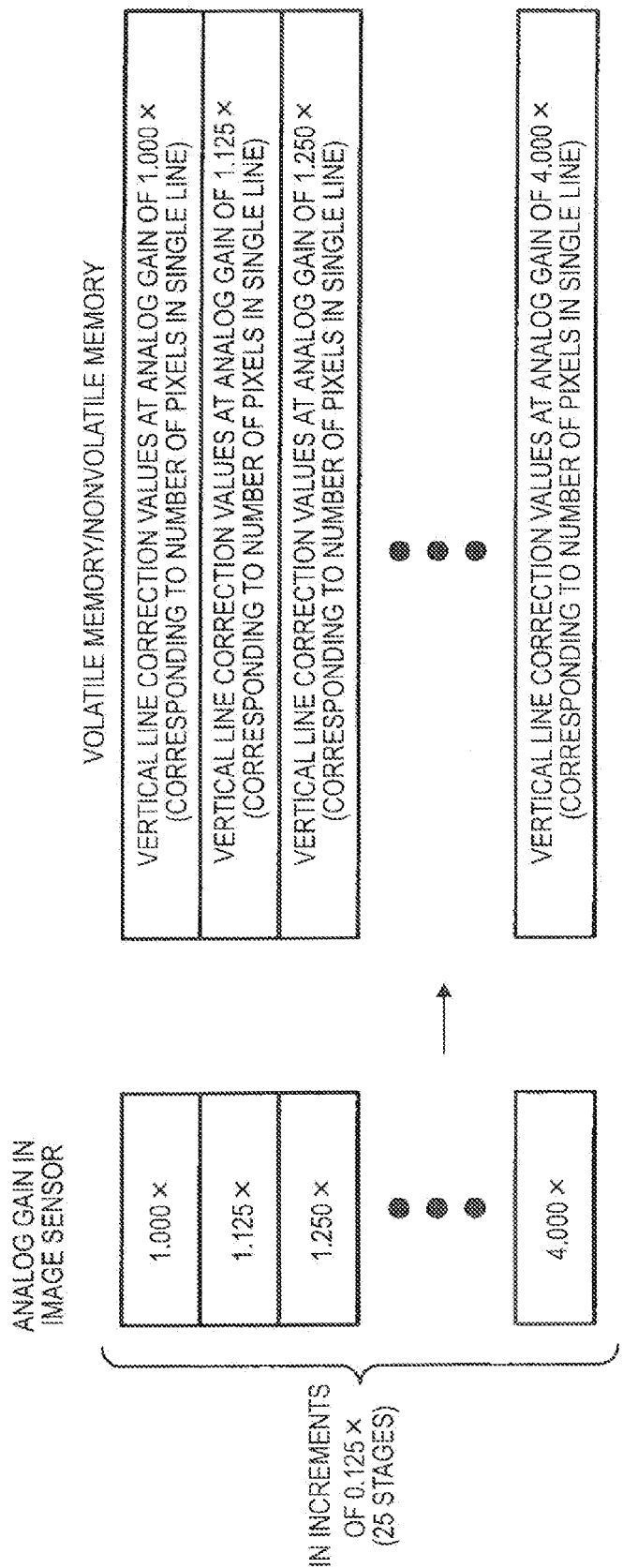
FIG. 5 is a descriptive diagram showing an example of calculation and storage of vertical line correction values according to the first embodiment of the present disclosure.

A vertical line level and the position where vertical line-shaped noise is produced also change as the magnitude of analog gain applied in the image sensor 10 changes. In view of the fact, a vertical line correction value is calculated in every analog gain stage. That is, a vertical line correction value is calculated in every analog gain stage from a minimum to a maximum. FIG. 5 shows an example of the relationship between the analog gain stage in the image sensor 10 and vertical line correction values stored in the volatile memory 30 (non-volatile memory 40). In the example shown in FIG. 5, the analog gain in the image sensor 10 ranges from 1× to 4×, and the number of stages is 25 spaced in increments of 0.125×.

In this case, the vertical line detector/corrector 22 calculates vertical line correction values corresponding to the number of pixels that form a single line (752) at an analog gain of 1.000× and a digital gain of 1×. The same calculation is then performed by changing the analog gain to 1.125× and repeated until the analog gain reaches 4.000×. Each set of the thus calculated vertical line correction values is stored in a predetermined area in the volatile memory 30.

Figure 6:
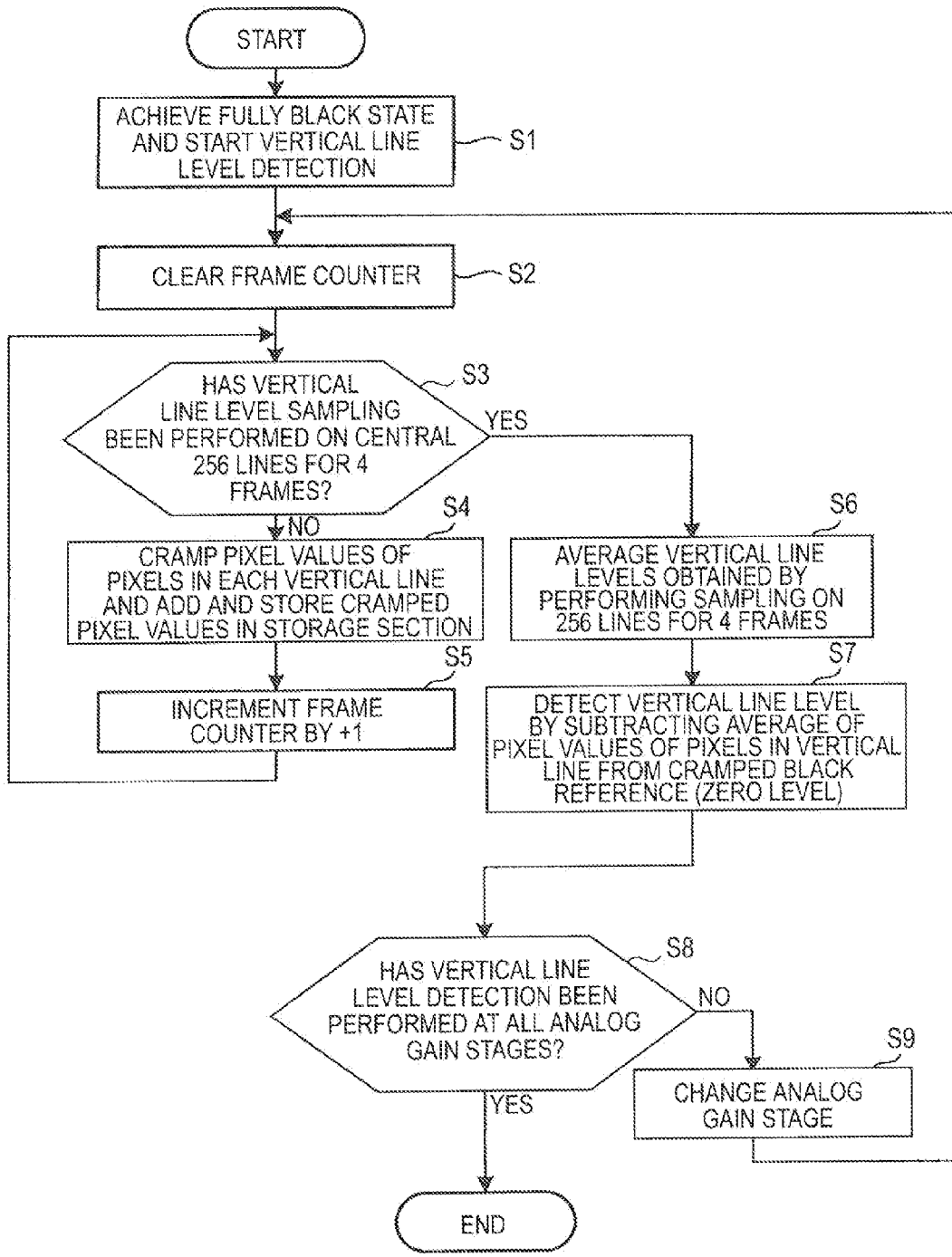
FIG. 6 is a flowchart showing an example of vertical line level detection according to the first embodiment of the present disclosure.

FIG. 6 is a flowchart showing part of the process steps of the vertical line correction value calculation performed by the vertical line detector/corrector 22 described above, specifically, those of performing the vertical line level detection. First, the lens is so blocked that a fully black state is achieved. An image of the fully black state is captured, and then the vertical line level detection is initiated (step S1). The value of a frame counter that counts the number of frames is then cleared (step S2). It is then judged whether or not vertical line level detection (sampling) has been performed on the central 256 lines arranged in the vertical direction in the effective pixel area for 4 frames (step S3). When the detection (sampling) has not been completed, the pixel values of the pixels in the vertical line in the position of each of the horizontal 752 pixels are cramped by the cramp processor 21, and the cramped pixel values are sequentially added and stored in the storage section 23 (step S4). When the process steps described above have been completed, the value of the frame counter is incremented by one (step S5), and the control returns to step S3.

When the judgment in step S3 shows that the vertical line level detection has been performed on the central 256 lines arranged in the vertical direction in the effective pixel area for 4 frames, the vertical line levels obtained by performing the detection described above on the 256 lines are averaged for 4 frames (step S6). Specifically, each set of the pixel values is averaged by dividing the corresponding one of the summed pixel values stored in the storage section 23 in step S4 by 1024 (=256 lines×4 frames). A vertical line level is subsequently detected by subtracting the average of the pixel values of the pixels in each of the vertical lines calculated in step S6 from the cramped black reference (zero) (step S7). It is subsequently judged whether or not the vertical line level detection has been performed at all the analog gain stages (step S8). When the detection has not been completed, the analog gain is changed to another stage (step S9) and the control returns to step S2. When the detection has been completed, the vertical line level detection is completed.

The vertical line correction values produced at each of the analog gain stages and stored in the volatile memory 30 are read by the vertical line detector/corrector 22 when the imaging apparatus 1 starts image capturing and used in actual correction. That is, whenever the analog gain is changed, the vertical line correction values corresponding to the changed analog gain stage are read for correction. As a result, after image capturing starts, correction values produced in advance are used to make correction in real time.

[Example of Defective Point/Shading Level Detection]

A description will next be made of an example of the defective point/shading level detection performed by the defect/shading detector 27 with reference to FIGS. 7 to 10.

Figure 7:
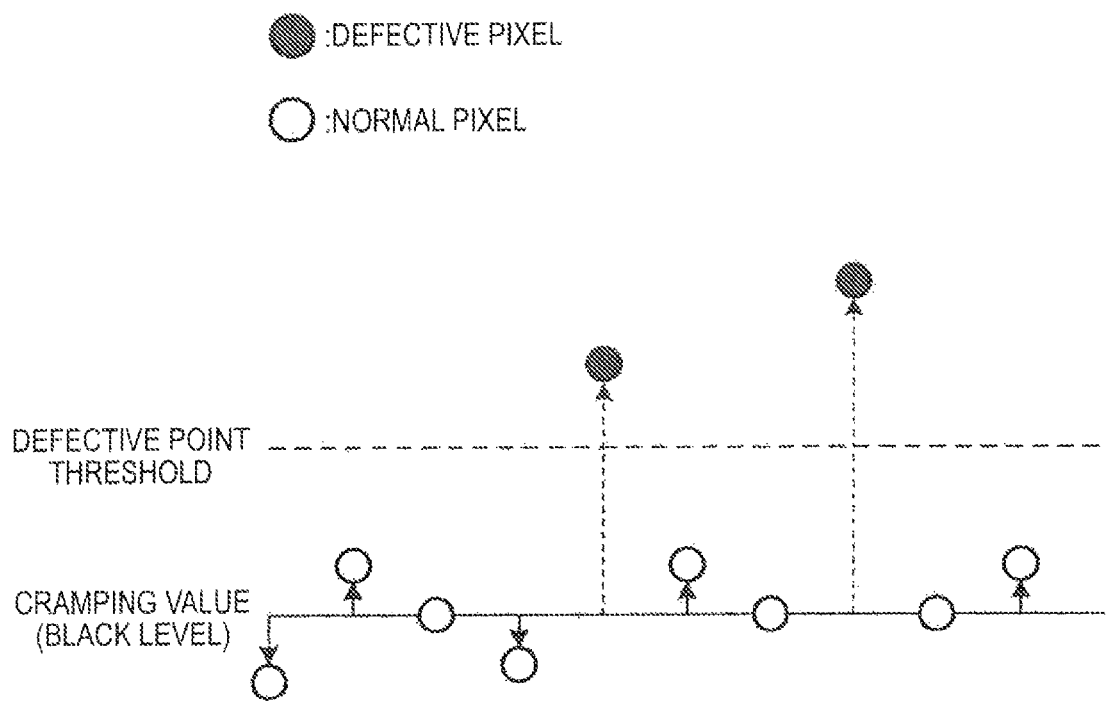
FIG. 7 a descriptive diagram showing an example of defective point detection according to the first embodiment of the present disclosure.
Figure 8:
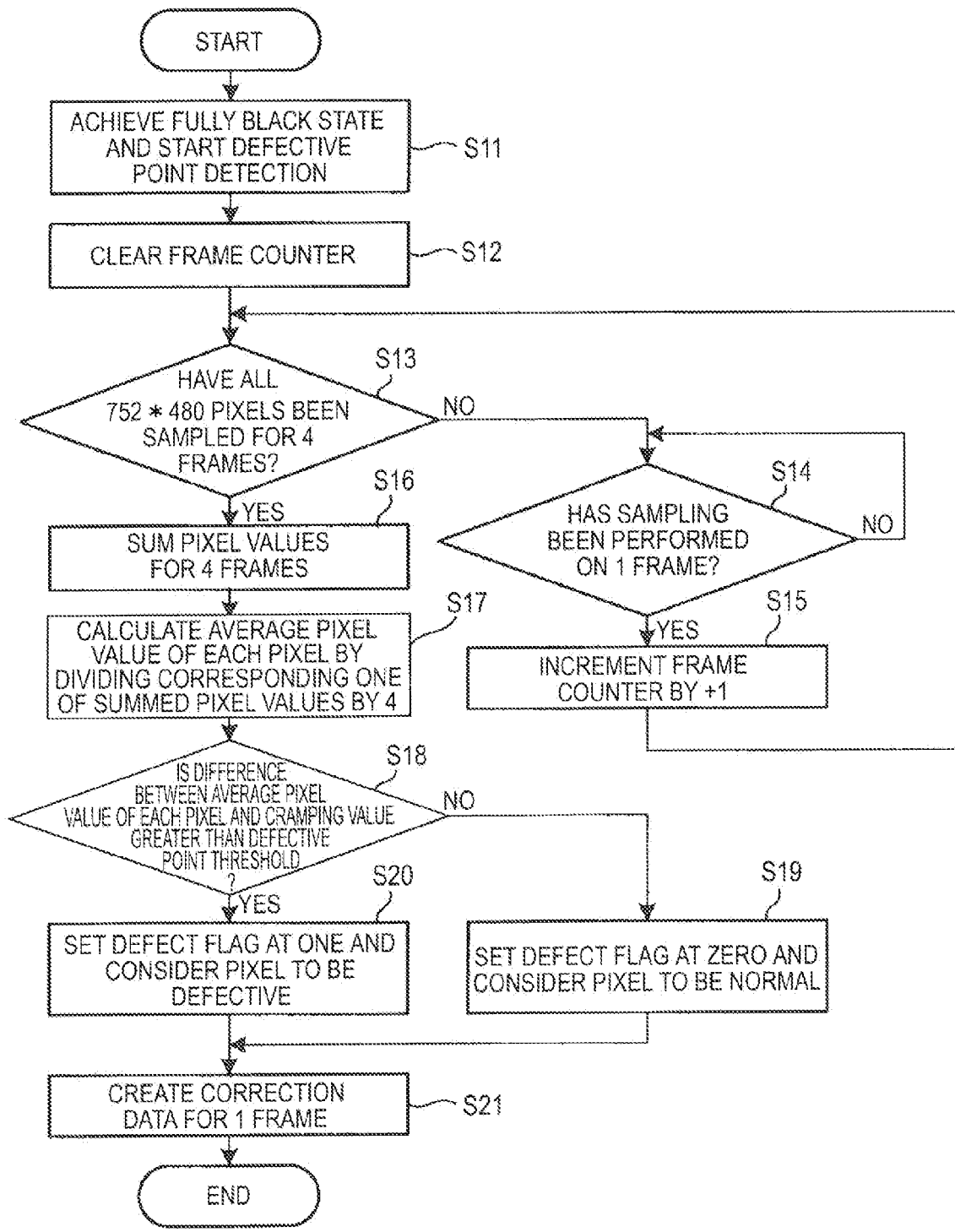
FIG. 8 is a flowchart showing an example of the defective point detection according to the first embodiment of the present disclosure.

The defective point detection will first be described with reference to FIGS. 7 and 8. FIG. 7 conceptually shows how a defective pixel is detected. The defect/shading detector 27 first determines a threshold for defective point detection in advance (hereinafter referred to as defective point threshold) and judges for each pixel in an inputted single frame whether or not the difference between the pixel value of the pixel and the cramping value is not greater than the defective point threshold. In the example shown in FIG. 7, each of the two pixels indicated by black circles, where the difference between the pixel value and the cramping value is greater than the defective point threshold, is judged to be defective points. That is, the defect flag for each of the two pixels is set at "1". For each of the other eight pixels, where the difference between the pixel value and the cramping value is not greater than the defective point threshold, the defect flag is set at "0". The detection described above is performed on all the pixels that form a single frame, and defective point correction data for the single frame are produced based on the detection result. In the present embodiment, the defective point detection is performed on all the pixels in 1 frame obtained by arithmetically averaging 4 frames to improve the precision in the defective point detection.

The procedure of the defective point detection will next be described with reference to the flowchart shown in FIG. 8. First, the lens is so blocked that a fully black state is achieved. An image of the fully black state is captured, and then the defective point detection is initiated (step S11). The value of the frame counter is then cleared (step S12). It is then judged whether or not all the 752 pixels multiplied by 480 lines in the effective pixel area have been sampled for 4 frames (step S13). When the sampling has not been completed, it is then judged whether or not the sampling has been performed on 1 frame (S14). Unless the sampling has not been performed on 1 frame, the judgment in step S14 is repeatedly made. When the sampling has been performed on 1 frame, the value of the frame counter is incremented by one, and the control returns to step S13.

When the judgment in step S13 shows that all the 752 pixels multiplied by 480 lines in the effective pixel area have been sampled for 4 frames, the pixel values of the sampled pixels are summed for 4 frames (step S16). The average pixel value of each of the pixels is calculated by dividing the corresponding one of the summed pixel values by 4 (step S17). It is then judged whether or not the difference between the average pixel value of each of the pixels and the cramping value is greater than the defective point threshold (step S18). When the difference is not greater than the defective point threshold, the defect flag is set at "0" and the pixel is considered to be normal (step S19). When the difference between the average pixel value of each of the pixels and the cramping value is greater than the defective point threshold, the defect flag is set at "1" and the pixel is considered to be defective (step S20). Defective pixel judgment data for a single frame is created based on the information obtained by the process steps described above (step S21), and the defective point detection is thus completed.

The thus set defect flag statuses are written to predetermined areas in the volatile memory 30 under the control of the memory controller 28, as described above. The defect corrector 26 then refers for each pixel to the corresponding defect flag written to the volatile memory 30. When the defect flag to which the defect corrector 26 refers is "1", the pixel value of the pixel in question is interpolated by the pixel values of surrounding pixels, whereas when the defect flag is "0", no processing is performed.

Figure 9A:
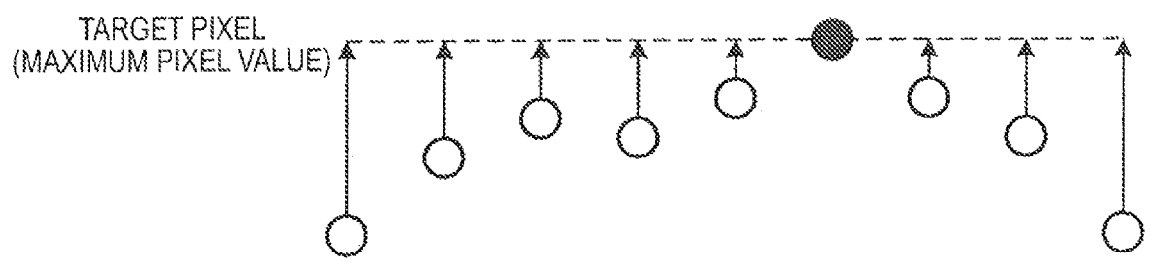
FIGS. 9A and 9B are descriptive diagrams showing examples of shading level detection according to the first embodiment of the present disclosure.
Figure 9B:
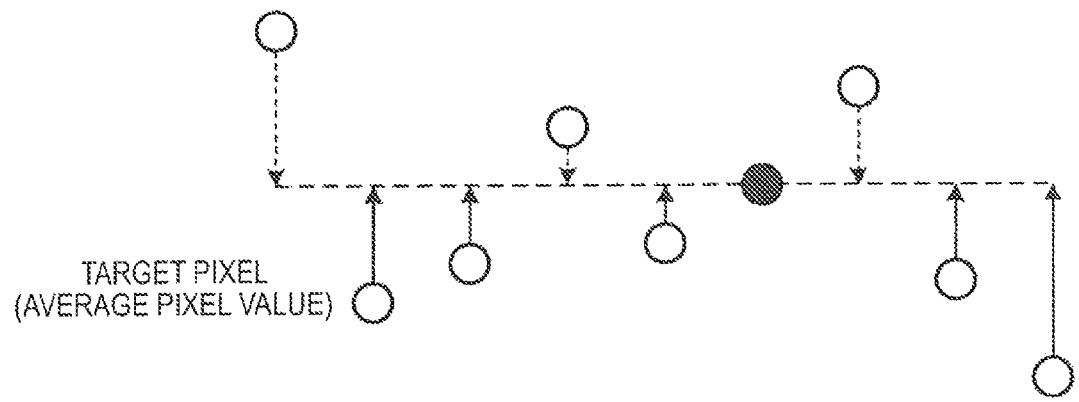
Figure 10:
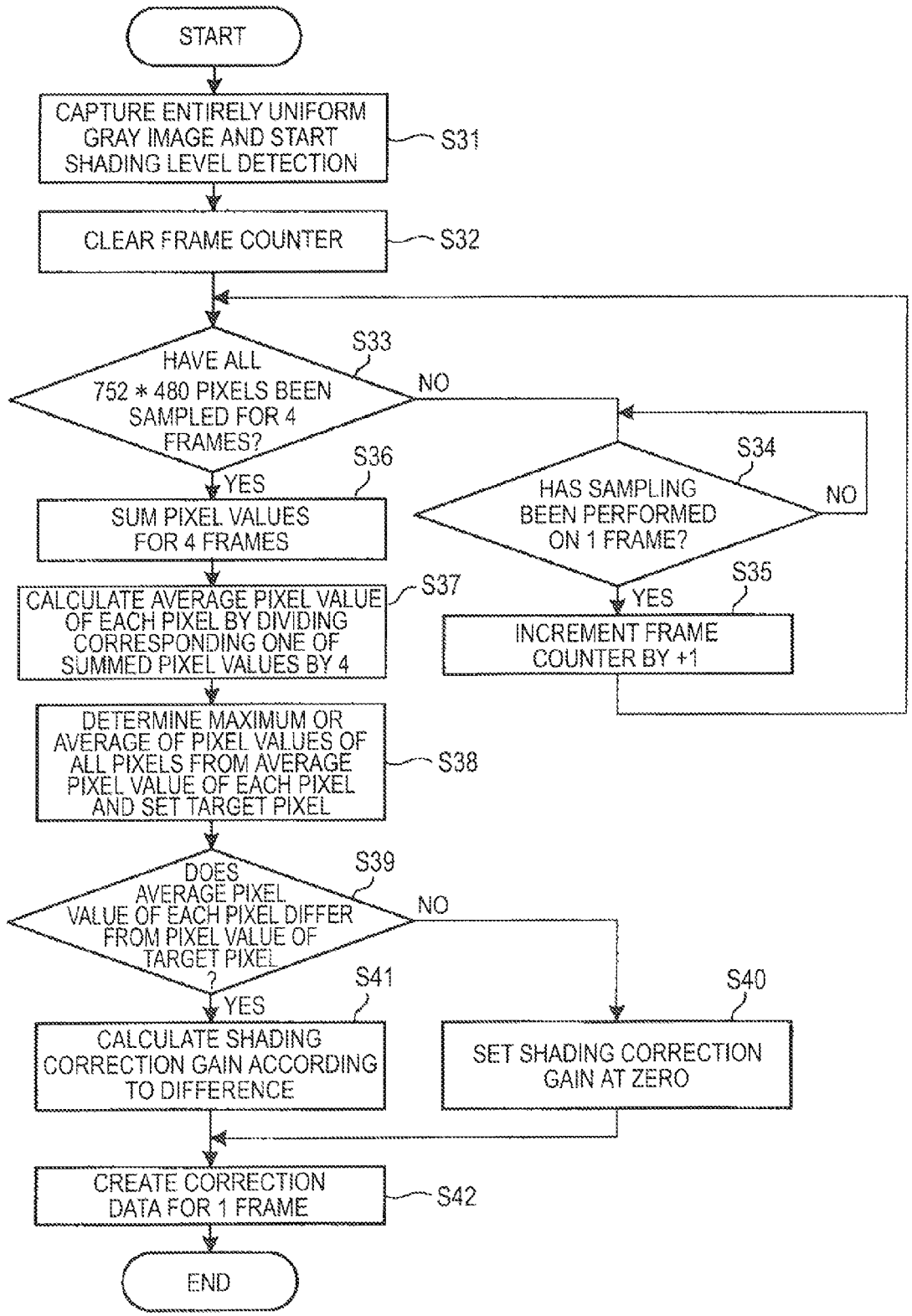
FIG. 10 is a flowchart showing an example of the shading level detection according to the first embodiment of the present disclosure.

The shading level detection will next be described with reference to FIGS. 9A, 9B, and 10. FIGS. 9A and 9B conceptually show how the shading level detection is performed. First, the maximum or the average of the pixel values of all pixels that form a single frame is calculated, and the pixel having the maximum or average pixel value is set as a target pixel. FIG. 9A shows an example of the shading level detection in a case where the pixel having the maximum pixel value is set as a target pixel, and FIG. 9B shows an example of the shading level detection in a case where the pixel having the average pixel value is set as a target pixel. When the pixel having the maximum pixel value is set as a target pixel as shown in FIG. 9A, shading correction gain according to the difference between the pixel value of each inputted pixel and the maximum pixel value is calculated so that the pixel value of the inputted pixel is equal to the maximum pixel value. When the pixel having the average pixel value is set as a target pixel as shown in FIG. 9B, shading correction gain according to the difference between the pixel value of each inputted pixel and the pixel value of the target pixel is calculated so that the pixel value of the inputted pixel is equal to the average pixel value. When the pixel having the average pixel value is set as a target pixel, negative (−) gain is applied to a pixel having a pixel value greater than the average pixel value, whereas positive (+) gain is applied to a pixel having a pixel value smaller than the average pixel value. The user can choose whether a target pixel has the maximum or average pixel value, as described above.

The procedure of the shading level detection will next be described with reference to the flowchart shown in FIG. 10.

First, an entirely uniform gray image is captured, and then the shading level detection is initiated (step S31). The value of the frame counter is then cleared (step S32). It is then judged whether or not all the 752 pixels multiplied by 480 lines in the effective pixel area have been sampled for 4 frames (step S33). When the sampling has not been completed, it is then judged whether or not the sampling has been performed on 1 frame (S34). Unless the sampling has not been performed on 1 frame, the judgment in step S34 is repeatedly made. When the sampling has been performed on 1 frame, the value of the frame counter is incremented by one (step S35), and the control returns to step S33.

When the judgment in step S33 shows that all the 752 pixels multiplied by 480 lines in the effective pixel area have been sampled for 4 frames, the pixel values of the sampled pixels are summed for 4 frames (step S36). The average pixel value of each of the pixels is calculated by dividing the corresponding one of the summed pixel values by 4 (step S37). The maximum or average of the pixel values of all the pixels in a single frame is determined from the average pixel value of each of the pixels determined in step S37, and the pixel having the maximum or average pixel value is set as a target pixel (step S38). It is subsequently judged whether or not the average pixel value of each of the pixels differs from the pixel value of the target pixel (step S39). When there is no difference, the shading correction gain is set at zero (step S40). When the average pixel value of the pixel in question differs from the pixel value of the target pixel, the shading correction gain is calculated in accordance with the difference (step S41). Correction data for a single frame is produced by performing the process steps described above on all the pixels in the single frame (step S42). The shading level detection is thus completed.

The shading correction gain data are stored in predetermined areas in the volatile memory 30 under the control of the memory controller 28, as described above. The shading correction gain data stored in the volatile memory 30 are read whenever a pixel signal is inputted to the multiplier 24, which multiplies the pixel signal by a relevant one of the shading correction gain data.

Figure 11:
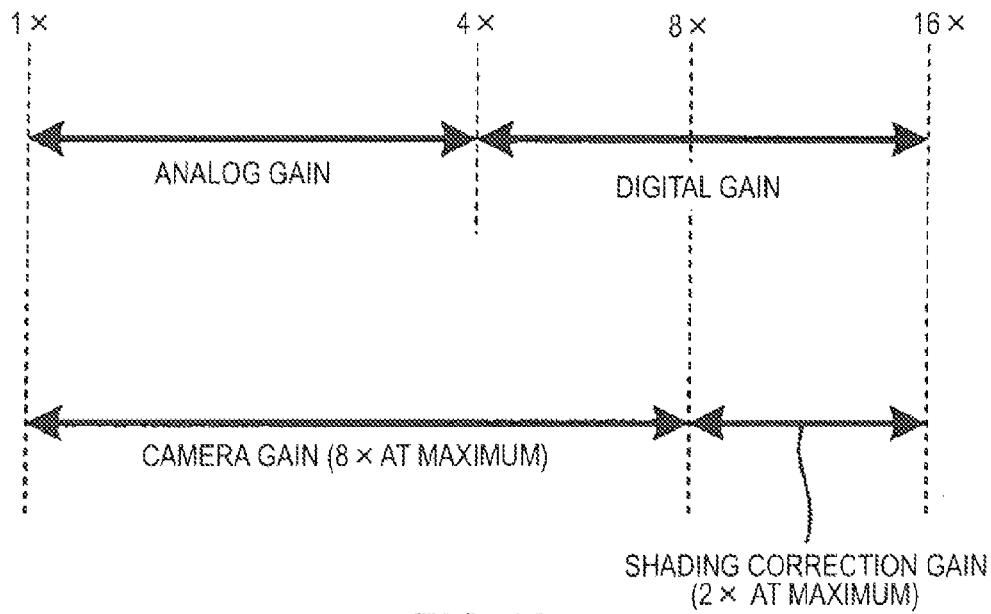
FIG. 11 is a descriptive diagram showing an example of a variable gain range in the imaging apparatus according to the first embodiment of the present disclosure.

Multiplying a pixel signal by shading correction gain in the multiplier 24 corrects not only vertical line-shaped noise but also white (modulation) shading resulting from the characteristics of the image sensor. FIG. 11 shows an adjustable gain range in the imaging apparatus 1 according to the present embodiment. The adjustable analog gain range in the image sensor 10 ranges from 1× to 4×, which is narrow, but digital gain ranging from 1× to 4× can be additionally applied, whereby the entire variable gain range is from 1× to 16×. The shading correction gain (2× at maximum) is responsible for part of the variable digital gain range, specifically, the portion that covers high gain factors. That is, the camera gain can be changed by a factor of eight, which is the sum of a factor of four of analog gain and another factor of four of digital gain.

[Example of How Data are Stored in Nonvolatile Memory and Volatile Memory]

Figure 12:
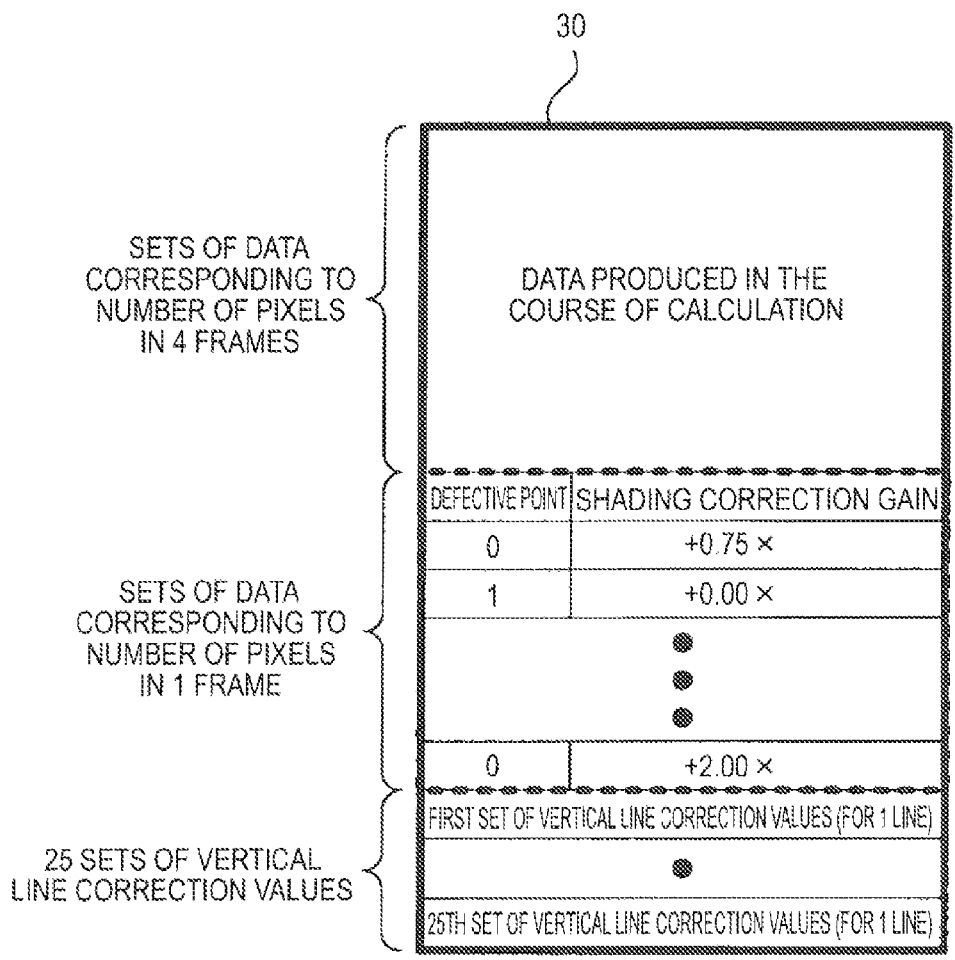
FIG. 12 is a descriptive diagram showing an example of the configuration of a volatile memory according to the first embodiment of the present disclosure.

An example of how data are stored in the nonvolatile memory 40 and the volatile memory 30 will next be described with reference to FIGS. 12 and 13. FIG. 12 shows an example of how data are stored in the volatile memory 30. The volatile memory 30 has an area for storing calculation data produced in the course of the correction value calculation performed in relevant components, and the storage area is provided for each of the pixels that form a single frame. The volatile memory 30 further has an area for storing the defect flag status and shading correction gain, and the storage area is provided for each of the pixels that form 4 frames. The volatile memory 30 further has areas for storing vertical line correction values. The number of storage areas is 25, which corresponds to the number of analog gain stages. Each of the 25 areas stores vertical line correction values corresponding to 752 pixels that form a single horizontal line in the effective pixel area.

Among the data stored in the volatile memory 30, the defect flag statuses, the shading correction gain values, and the vertical line correction values are saved in the nonvolatile memory 40, as shown in FIG. 13. The data stored in the nonvolatile memory 40 are read under the control of the controller 29, for example, when the imaging apparatus is powered on and loaded into the volatile memory 30.

As described above, in the imaging apparatus 1 according to the present embodiment, vertical line correction values corresponding to all the analog gain stages are stored in advance, and actual correction is made based on the vertical line correction values, whereby correction can be made in accordance with change in gain for each frame. Further, after image capturing starts, since necessary operation is only reading the vertical line correction values stored in advance and making correction accordingly, the imaging apparatus 1 can adequately meet requirements in any application that typically requires real-time operation, such as machine vision.

Further, in the present embodiment, since the vertical line level detection is performed based on a plurality of (256) lines in the effective pixel area instead of the vertically extending OPB area, the vertical line level detection is performed more precisely and the vertical line correction is made in a more satisfactory manner. As a result, even in an imaging apparatus in which the variable analog gain range is narrow and digital gain is applied in addition to the analog gain, vertical line-shaped noise can be corrected. Further, random noise components can be removed by sampling pixel values for a plurality of frames (4 frames). In this process, setting the number of frames used in the sampling at 4 minimizes the areas necessary to store calculation data (volatile memory 30) produced in the course of the correction value calculation even when an effective pixel signal is formed of a plurality of pixel signals.

Further, in the present embodiment, the vertical line detector/corrector 22 and the multiplier 24 for the digital gain and shading correction gain multiplication are disposed between the cramp processor 21 and the pedestal processor 25. This configuration eliminates the need to add a circuit for fixing and restoring the black level to the block for shading correction and any of the other blocks. That is, the process associated with the black level can be simplified, and the scale of the circuit in the entire imaging apparatus 1 can be reduced. Further, since the single multiplier 24 can perform the digital gain multiplication and the shading correction gain multiplication, the number of multipliers can be smaller than a case where circuits for performing the multiplication-related processes are separately provided.

<2. Second Embodiment>
[Example of Overall System Configuration]

An imaging apparatus according to a second embodiment of the present disclosure will next be described with reference to FIG. 14. In FIG. 14, the portions corresponding to those in FIG. 1 have the same reference characters, and no description of these portions will be made in detail. In the second embodiment, a multiplier for digital gain and a multiplier for shading correction gain are not integrated into a single multiplier, but a multiplier only for digital gain is provided. The second embodiment further differs from the first embodiment in terms of how the vertical line detector/corrector 22 detects vertical line levels and where the multiplier 24 is located. The second embodiment agrees with the first embodiment in that the vertical line level detection is performed for every analog gain stage but differs there from in that the vertical line level detection is performed with the digital gain maximized. That is, when the maximum of the digital gain is 4×, vertical line levels are sampled by setting the digital gain at 4×.

Since the vertical line level detection is performed by setting the digital gain at 4×, large vertical line correction values are produced based on the detected vertical line levels. In this case, the gain applied by the multiplier 24, which multiplies a pixel signal by any of the vertical line correction values, is set to be the reciprocal of the digital gain. For example, when the digital gain is 4×, the pixel signal is multiplied by a vertical line correction value of 1× (4× multiplied by ¼), or when the digital gain is 2×, the pixel signal is multiplied by a vertical line correction value of 0.5× (2× multiplied by ¼). That is, the vertical line correction values are normalized before multiplication to values according to the digital gain. As shown in FIGS. 3 and 4, since a vertical line correction value before and after the digital gain multiplication is accurately proportional to the digital gain factor, vertical line-shaped noise can be corrected by performing the processes described above.

To make the correction described above, which can be considered as "overcorrection," a pixel signal needs to be multiplied by a vertical line correction value that is accurately the reciprocal of a detected vertical line level, otherwise the vertical line correction is not performed in a satisfactory manner. In the present embodiment, in which vertical line-shaped noise is efficiently removed, a multiplier that multiplies a pixel signal by shading correction gain is provided separately from the multiplier 24, which multiplies the pixel signal by digital gain. Further, the multiplier 24 for digital gain multiplication is disposed upstream of the vertical line detector/corrector 22. The configuration described above simplifies the image processing in a signal processor 20a, as compared with the image processing in the first embodiment, whereby the bit length necessary to express a pixel can be shorter than the bit length necessary in the imaging apparatus 1 according to the first embodiment.

In an imaging apparatus 1a according to the second embodiment described above, the bit length necessary to express a pixel can be shortened so that the scale of the image processing circuit can be reduced as well as the advantageous effect provided in the first embodiment.

The present disclosure contains subject matter related to that disclosed in Japanese Priority Patent Application JP 2010-234652 filed in the Japan Patent Office on Oct. 19, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a plurality of pixels that convert subject light incident through a lens into electric charge and accumulate the electric charge, the plurality of pixels being disposed in an optically black area so blocked that no light is incident thereon and outputting optically black signals and in an effective pixel area unblocked so that light is incident thereon, the pixels disposed in the optically black area and the effective pixel area being arranged in a matrix in horizontal and vertical directions;

an analog amplifier that applies predetermined gain to the electric charge read as an effective pixel signal from each of the pixels in the effective pixel area and outputs the resultant signal;

a vertical line detector that calculates a correction value used to remove vertical line-shaped fixed pattern noise based on a vertical line level that is detected by changing a gain factor of the analog amplifier from a minimum to a maximum with the lens blocked, reading a pixel value of each pixel disposed in each vertical column arranged in an area formed of predetermined horizontal rows in the effective pixel area, calculating an arithmetic average of the read pixel values in each of the vertical columns, and subtracting each of the calculated arithmetic averages from a cramped black reference;

a vertical line corrector that adds each of the correction values calculated by the vertical line detector to the corresponding effective pixel signal to remove the vertical line-shaped fixed pattern noise; and a multiplier that multiplies each of the effective pixel signals by the digital gain or multiplies each of the pixel signals having undergone the vertical line correction in the vertical line corrector so that the pixel signal contains no vertical line-shaped fixed pattern noise by the digital gain.

2. The imaging apparatus according to claim 1, wherein the vertical line detector calculates the arithmetic averages based on pixels in at least 4 frames.

3. The imaging apparatus according to claim 2, wherein the vertical line detector, the vertical line corrector, and the multiplier are disposed downstream of a cramp processor and upstream of a pedestal processor, the cramp processor subtracting a predetermined cramping value from the pixel value of the effective pixel signal read from each of the pixels in the effective pixel area to fix the black level, the pedestal processor adding the cramping value to an inputted pixel signal to restore the black level.

4. The imaging apparatus according to claim 3, further comprising a shading detector that produces a correction value for shading correction, the correction value produced by calculating an arithmetic average of the pixel value of the effective pixel signal from each of the pixels disposed in the effective pixel area averaged for at least 4 frames, calculating a maximum and/or an average of the arithmetic averages in the effective pixel area, and determining the correction value in accordance with how much the pixel value of the effective pixel signal differs from the maximum and/or the average of the arithmetic averages,
wherein the multiplier multiplies a pixel signal having undergone the vertical line correction by the corresponding correction value for shading correction produced by the shading detector.

5. The imaging apparatus according to claim 3, wherein the vertical line detector acquires the pixel values of the pixels disposed in each of the vertical columns arranged in the area formed of the predetermined horizontal rows in the effective pixel area with the digital gain maximized in every stage of the analog amplifier and calculates an arithmetic average of the pixel values in each of the vertical columns, and
the vertical line corrector multiplies each of the correction values produced by the vertical line detector by a reciprocal of the digital gain.

6. An imaging method comprising:

providing a plurality of pixels that convert subject light incident through a lens into electric charge and accumulate the electric charge, reading the electric charge as an effective pixel signal from each pixel disposed in an effective pixel area so unblocked that light is incident thereon, applying predetermined gain to the effective pixel signal, and outputting the resultant signal;

changing a gain factor of an analog amplifier from a minimum to a maximum with the lens blocked and reading a pixel value of each pixel disposed in each vertical column arranged in an area formed of predetermined horizontal rows in the effective pixel area;

calculating an arithmetic average of the read pixel values in each of the vertical columns and subtracting each of the calculated arithmetic averages from a cramped black reference to detect a vertical line level;

calculating a correction value used to remove vertical line-shaped fixed pattern noise based on each of the vertical line levels;

adding each of the calculated correction values to the corresponding effective pixel signal to remove the vertical line-shaped fixed pattern noise; and multiplying each of the effective pixel signals by digital gain or multiplying each of the pixel signals having undergone the vertical line correction so that the pixel signal contains no vertical line-shaped fixed pattern noise by digital gain.

* * * * *